(12) United States Patent
Choate et al.

(10) Patent No.: US 11,326,712 B2
(45) Date of Patent: May 10, 2022

(54) NO-BOLT VALVE ASSEMBLY SYSTEM

(71) Applicant: Baker Hughes Oilfield Operations LLC, Houston, TX (US)

(72) Inventors: Jeremy Ryan Choate, Houston, TX (US); Keith M Adams, Katy, TX (US); Lloyd Cheatham, Lake Jackson, TX (US); Robert K Law, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 103 days.

(21) Appl. No.: 16/728,213

(22) Filed: Dec. 27, 2019

(65) Prior Publication Data

US 2020/0132212 A1 Apr. 30, 2020

Related U.S. Application Data

(63) Continuation-in-part of application No. 16/158,490, filed on Oct. 12, 2018, now Pat. No. 10,774,945,
(Continued)

(51) Int. Cl.
*F16K 27/00* (2006.01)
*F16K 31/122* (2006.01)
(Continued)

(52) U.S. Cl.
CPC .......... *F16K 31/1228* (2013.01); *F16K 27/00* (2013.01); *F16K 31/1221* (2013.01);
(Continued)

(58) Field of Classification Search
CPC .... F16K 27/00; F16K 27/044; F16K 31/1221; F16K 31/1228; F16K 31/1262;
(Continued)

(56) References Cited

U.S. PATENT DOCUMENTS 2,582,996 A 1/1952 Laurent
2,610,820 A 9/1952 Markel
(Continued)

FOREIGN PATENT DOCUMENTS

CN 2121592 11/1992
CN 101093034 12/2007
(Continued)

OTHER PUBLICATIONS

PCT International Preliminary Report on Patentability issued in connection with corresponding PCT Application No. PCT/US2016/036328 dated Dec. 21, 2017.
(Continued)

*Primary Examiner* — Matthew W Jellett
(74) *Attorney, Agent, or Firm* — Hogan Lovells US LLP (57) ABSTRACT

A valve assembly includes an actuator adapted to drive movement of a valve member between an open position and a closed position. The valve assembly also includes a bonnet coupled to the actuator and a valve body coupled to the bonnet, the bonnet arranged between at least a portion of the actuator and the valve body. The valve assembly further includes a quick connector adapted to couple the bonnet to the valve body. The quick connector includes a plurality of bonnet lugs separated by a plurality of spaces, the plurality of bonnet lugs extending radially outward from an axis. The quick connector also includes a plurality of valve body lugs configured to interact with the plurality of bonnet lugs, the plurality of bonnet lugs being arranged to axially align with the plurality of valve body lugs to block axial movement of the bonnet with respect to the valve body.

15 Claims, 5 Drawing Sheets

Related U.S. Application Data which is a continuation of application No. 15/175,122, filed on Jun. 7, 2016, now Pat. No. 10,132,422, which is a continuation-in-part of application No. 14/949,324, filed on Nov. 23, 2015, now Pat. No. 9,759,240, which is a continuation-in-part of application No. 13/832,884, filed on Mar. 15, 2013, now Pat. No. 9,212,758.

(60) Provisional application No. 62/172,544, filed on Jun. 8, 2015, provisional application No. 61/747,479, filed on Dec. 31, 2012.

(51) Int. Cl.
    *F16K 37/00*   (2006.01)
    *F16K 31/126*  (2006.01)
    *F16K 35/08*   (2006.01)
    *F16K 35/06*   (2006.01)

(52) U.S. Cl.
    CPC ...... *F16K 37/0008* (2013.01); *F16K 31/1262* (2013.01); *F16K 35/06* (2013.01); *F16K 35/08* (2013.01); *Y10T 137/6065* (2015.04)

(58) Field of Classification Search
    CPC ........ F16K 31/508; F16K 35/06; F16K 35/08; F16K 37/0008; Y10T 137/6065
    See application file for complete search history.

(56) References Cited

U.S. PATENT DOCUMENTS

| | | | |
|---|---|---|---|
| 2,935,166 A | 9/1960 | Carlson, Jr. |
| 3,082,792 A | 3/1963 | Jenkins |
| 3,115,068 A | 12/1963 | Lofink |
| 3,139,898 A | 7/1964 | Wiltgen |
| 3,146,682 A | 9/1964 | Price et al. |
| 3,175,473 A | 3/1965 | Boteler et al. |
| 3,293,992 A | 12/1966 | Baumann |
| 3,380,470 A | 4/1968 | Culpepper, Jr. et al. |
| 3,593,959 A | 7/1971 | Greene |
| 3,792,717 A | 2/1974 | Tibbals |
| 3,811,457 A | 5/1974 | Crossman |
| 3,882,400 A | 5/1975 | Lewis |
| 3,955,793 A | 5/1976 | Burkhardt et al. |
| 3,958,592 A | 5/1976 | Wells |
| 3,993,284 A | 11/1976 | Lukens, Jr. |
| 4,135,546 A | 1/1979 | Morrison |
| 4,135,547 A | 1/1979 | Akkerman |
| 4,187,764 A | 2/1980 | Cho |
| 4,274,432 A | 6/1981 | Tunstall et al. |
| 4,309,022 A | 1/1982 | Reinicket et al. |
| 4,354,425 A | 10/1982 | Bruton et al. |
| 4,424,738 A | 1/1984 | Leighton |
| 4,480,811 A | 11/1984 | Card et al. |
| 4,489,756 A | 12/1984 | Balz |
| 4,491,060 A | 1/1985 | Boski |
| 4,527,769 A | 7/1985 | Stogner et al. |
| 4,529,330 A | 7/1985 | Boski |
| 4,585,207 A | 4/1986 | Shelton |
| 4,620,562 A | 11/1986 | Pacht |
| 4,624,442 A | 11/1986 | Duffy et al. |
| 4,633,898 A | 1/1987 | Denk |
| 4,650,151 A | 3/1987 | McIntyre |
| 4,721,284 A | 1/1988 | Bankard |
| 4,768,545 A | 9/1988 | Hoffman |
| 4,871,143 A | 10/1989 | Baker |
| 4,934,403 A | 6/1990 | Mooney et al. |
| 4,967,785 A | 11/1990 | Young |
| 5,067,392 A | 11/1991 | Gautier |
| 5,294,090 A | 3/1994 | Winnike |
| 5,464,040 A | 11/1995 | Johnson |
| 5,499,648 A | 3/1996 | Powell et al. |
| 5,964,446 A | 10/1999 | Walton et al. |
| 6,015,134 A | 1/2000 | Johnson |
| 6,041,804 A | 3/2000 | Chatufale |
| 6,050,541 A | 4/2000 | Chatufale |
| 6,086,039 A | 7/2000 | Sievers et al. |
| 6,089,531 A | 7/2000 | Young |
| 6,397,892 B1 | 6/2002 | Pyle et al. |
| 6,487,960 B1 | 12/2002 | Chatufale |
| 6,659,419 B2 | 12/2003 | Chatufale |
| 6,672,331 B2 | 1/2004 | Heald |
| 6,684,897 B2 | 2/2004 | Sundararajan |
| 6,854,704 B1 | 2/2005 | Young |
| 7,124,774 B2 | 10/2006 | Weingarten |
| 7,159,839 B2 | 1/2007 | Tanikawa et al. |
| 7,647,861 B2 | 1/2010 | Bessman |
| 8,282,070 B2 | 10/2012 | Davies, Jr. |
| 8,322,359 B2 | 12/2012 | Zecchi et al. |
| 8,708,309 B2 | 4/2014 | Roper et al. |
| 8,864,102 B2 | 10/2014 | Gamache |
| 8,910,658 B2 | 12/2014 | Adams et al. |
| 8,991,420 B2 | 3/2015 | Adams et al. |
| 8,998,166 B2 | 4/2015 | Adams et al. |
| 9,016,307 B2 | 4/2015 | Matalon |
| 9,033,308 B2 | 5/2015 | Kiesbauer et al. |
| 9,212,758 B2 | 12/2015 | Adams et al. |
| 9,568,117 B2 | 2/2017 | Adams et al. |
| 9,759,240 B2 | 9/2017 | McEvoy et al. |
| 2002/0175303 A1 | 11/2002 | Chatufale |
| 2003/0034465 A1 | 2/2003 | Adams et al. |
| 2004/0007682 A1 | 8/2004 | Engle et al. |
| 2005/0087712 A1 | 4/2005 | Lymberopoulos |
| 2007/0290154 A1 | 12/2007 | Aoyama |
| 2011/0042604 A1* | 2/2011 | Jens ................ F16K 31/1221 251/324 |
| 2011/0240126 A1 | 10/2011 | Lymberopoulos et al. |
| 2012/0227983 A1 | 9/2012 | Lymberopoulos et al. |
| 2012/0318388 A1 | 12/2012 | Du |
| 2014/0138564 A1 | 5/2014 | Adams et al. |
| 2014/0174554 A1 | 6/2014 | Meyberg et al. |
| 2015/0204456 A1 | 7/2015 | Adams et al. |

FOREIGN PATENT DOCUMENTS

| | | |
|---|---|---|
| CN | 202302237 | 7/2012 |
| CN | 202432085 | 9/2012 |
| DE | 102011015646 | 10/2012 |
| EP | 0416966 | 3/1991 |
| EP | 0486824 | 5/1992 |
| FR | 1195213 | 11/1959 |
| GB | 1148817 | 4/1969 |
| GB | 2022704 | 12/1979 |
| GB | 2168787 | 6/1986 |
| GB | 2303199 | 2/1997 |
| JP | 2008069795 | 3/2008 |
| JP | 2010048271 | 3/2010 |
| WO | 2014099505 | 6/2014 |

OTHER PUBLICATIONS

Actuators Pressure Control CHA Top Access Standard Hydraulic Actuator, GE Oil & Gas, 2013.

International Search Report and Written Opinion issued in connection with related PCT Application No. PCT/US2013/067666, dated Mar. 3, 2014.

International Search Report and Written Opinion issued in connection with related PCT Application No. PCT/US13/077392, dated Mar. 7, 2014.

Non-Final Rejection towards related U.S. Appl. No. 13/679,553 dated Mar. 28, 2014.

International Search Report and Written Opinion issued in connection with related PCT Application No. PCT/US2013/074223 dated Apr. 3, 2014.

Non-Final Rejection towards related U.S. Appl. No. 13/717,073 dated Jul. 31, 2014.

Non-Final Rejection towards related U.S. Appl. No. 14/107,589 dated Aug. 13, 2014.

Final Rejection towards related U.S. Appl. No. 13/679,553 dated Oct. 17, 2014.

(56) References Cited

OTHER PUBLICATIONS

Notice of Allowance issued in connection with related U.S. Appl. No. 13/679,553 dated Nov. 21, 2014.
Non-Final Rejection towards related U.S. Appl. No. 14/673,178 dated Jul. 30, 2015.
International Search Report and Written Opinion issued in connection with related PCT Application No. PCT/US2015/49556, dated Nov. 19, 2015.
Actuators NoBolt Dual Seal Pneumatic Actuator, GE Oil & Gas, 2015.
Office Action issued in connection with related CN Application No. 201380070284.5 dated May 25, 2016.
Office Action issued in connection with related CN Application No. 201380074076.2 dated Jun. 30, 2016.
Office Action issued in connection with related CN Application No. 201380070678.0 dated Jul. 5, 2016.
Non-Final Rejection towards related U.S. Appl. No. 14/673,178 dated Jul. 15, 2016.
PCT Search Report and Written Opinion for related application PCT/US2013/077412 dated Mar. 7, 2014.
Prov. U.S. Appl. No. 62/172,544, filed Jun. 8, 2015.

\* cited by examiner

NO-BOLT VALVE ASSEMBLY SYSTEM

CROSS REFERENCE TO RELATED APPLICATIONS

This application is a continuation-in-part of co-pending U.S. patent application Ser. No. 16/158,490 filed Oct. 12, 2018 titled "COMPOUND EXPRESS ACTUATOR CONNECTION," which is a continuation of U.S. patent application Ser. No. 15/175,122, now U.S. Pat. No. 10,132,422, filed Jun. 7, 2016 titled "COMPOUND EXPRESS ACTUATOR CONNECTION," which claims priority to U.S. Provisional Application No. 62/172,544 filed Jun. 8, 2015 titled "Compound Express Actuator Connection," and which is a continuation-in-part of U.S. patent application Ser. No. 14/949,324, now U.S. Pat. No. 9,759,240, filed Nov. 23, 2015 titled "No-Bolt Security Latching System," which is a continuation-in-part of U.S. application Ser. No. 13/832,884, now U.S. Pat. No. 9,212,758, titled "Quick Connect Valve Actuator," filed Mar. 15, 2013, which claims priority to U.S. Provisional Patent Application No. 61/747,479, titled "Quick Connect Valve Actuator," filed on Dec. 31, 2012, the disclosure of each which is incorporated herein by reference in its entirety.

BACKGROUND OF THE DISCLOSURE

1. Field of the Disclosure

The present disclosure relates in general to valves for mineral recovery wells, and in particular to components forming portions of valve assemblies.

2. Brief Description of Related Art

Various industrial applications may utilize valves to regulate a flow of fluid (e.g., solid, liquid, gas, or a combination thereof) between different components or associated equipment. Valves may be manually operated or may include actuators that are driven by a secondary force, such as a pneumatic force, a hydraulic force, or an electrical impulse that drives a motor. The actuators (powered or manually operated) may move a valve stem linearly or rotationally to adjust a position of a valve member between an open position and a closed position, as well as various intermediate positions. Typically, valve assemblies may be formed by a valve body, bonnet, and associated actuating mechanism (e.g., manual or automatic). Bolts and other mechanical fasteners are typically used to join different components of the valve assemblies together. Bolting of the components may be controlled by industry standards, such as API 6A for oil and gas operations. The standards and coupling actions may be time consuming and challenging, which may increase costs to operators.

SUMMARY OF THE DISCLOSURE

Applicants recognized the problems noted above herein and conceived and developed embodiments of systems and methods, according to the present disclosure, for valve assemblies.

In an embodiment, a valve assembly includes an actuator adapted to drive movement of a valve member between an open position and a closed position. The valve assembly also includes a bonnet coupled to the actuator and a valve body coupled to the bonnet, the bonnet arranged between at least a portion of the actuator and the valve body. The valve assembly further includes a quick connector adapted to couple the bonnet to the valve body. The quick connector includes a plurality of bonnet lugs separated by a plurality of spaces, the plurality of bonnet lugs extending radially outward from an axis. The quick connector also includes a plurality of valve body lugs configured to interact with the plurality of bonnet lugs, the plurality of bonnet lugs being arranged to axially align with the plurality of valve body lugs to block axial movement of the bonnet with respect to the valve body.

In another embodiment, a valve assembly includes an actuator configured to drive movement of a valve stem between a first position and a second position. The valve assembly also includes a valve body, the valve comprising a valve member coupled to the valve stem, wherein movement of the valve stem drives movement of the valve member between the first position and the second position. The valve assembly further includes a bonnet adapted to couple the actuator to the valve body, the bonnet being arranged between the actuator and the valve body. The bonnet includes a first connector adapted to couple to the actuator, the first connector comprising a plurality of first bonnet lugs having a plurality of first spaces between adjacent first bonnet lugs of the plurality of first bonnet lugs, the first spaces arranged to permit movement of corresponding actuator lugs to move axially with respect to the bonnet through the first spaces and to block axial movement of the actuator relative to the bonnet when the plurality of first bonnet lugs are axially aligned with the actuator lugs. The bonnet also includes a second connector adapted to couple to the valve body, the second connector comprising a plurality of second bonnet lugs having a plurality of second spaces between adjacent first bonnet lugs of the plurality of first bonnet lugs, the second spaces arranged to permit movement of corresponding valve body lugs to move axially with respect to the bonnet through the spaces and to block axial movement of the valve body relative to the bonnet when the plurality of second bonnet lugs are axially aligned with the valve body lugs.

In an embodiment, a valve assembly includes a bonnet having a plurality of bonnet lugs extending radially outward from a longitudinal axis, the plurality of bonnet lugs each having a first circumferential length less than an outer circumference of the bonnet, wherein each bonnet lug is separated from an adjacent bonnet lug by a bonnet space, the plurality of bonnet lugs forming at least a portion of a bonnet groove. The valve assembly also includes a valve body having a plurality of valve body lugs extending radially inward toward the longitudinal axis, the plurality of valve body lugs each having a second circumferential length less than an outer circumference of valve body, wherein each valve body lug is separated from an adjacent valve body lug by a valve body space. In embodiments, the second circumferential length is less than bonnet space circumferential length to permit passage of the plurality valve body lugs through respective bonnet spaces when the plurality valve body lugs are aligned with the bonnet spaces, and wherein axial movement of the bonnet relative to the valve body is blocked when the plurality of valve body lugs, arranged with the bonnet groove, are axially aligned with the plurality of bonnet lugs.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Furthermore, like reference numbers may be used between figures to illustrate like components, but it should be appreciated that embodiments are not limited to utilizing like components.

Embodiments of the present disclosure include systems and methods for forming quick connections between various valve components. In various embodiments, the quick connections may refer to couplings between various components that do not include bolts or other threaded fasteners, but rather, a series of lugs that may be utilized to block relative movement between associated components, such as axial movement. In various embodiments, utilization of the quick connection system (e.g., the lugs) may reduce time to couple various components of a valve assembly together, such as an actuator to a bonnet, an actuator to a valve body, a bonnet to a valve body, and the like. Reducing the time to make connections may reduce costs for operations and also simplify operations. In embodiments, the system further includes environmental seals arranged proximate the lug system that may block fluids or the like from moving from a position within the valve assembly to a position outside of the valve assembly. Furthermore, additional sealing systems may also be utilized to effectively isolate components of the valve assembly.

In various embodiments, a valve to bonnet quick connection is illustrated. Traditionally bonnets are attached to valve bodies using studs and nuts. Machining threaded holes on the body is time consuming and prone to defects. The illustrated quick connection removes the use of bolting for the connection between the valve body and the bonnet. In various embodiments, a lug-type connector is utilized with a pressure containing seal to form the quick connection. Accordingly, the time to form the connection is reduced due to removal of the bolting, which is torqued to predefined levels and also may require thread treating and other processes. Furthermore, costs may be reduced because the valve bodies and bonnets may be machined to utilize the quick connection and eliminate process steps that include adding bolt holes. Furthermore, in various embodiments, the requirements of API 6A may not apply to the quick connection due to the removal of the bolts.

Figure 1:
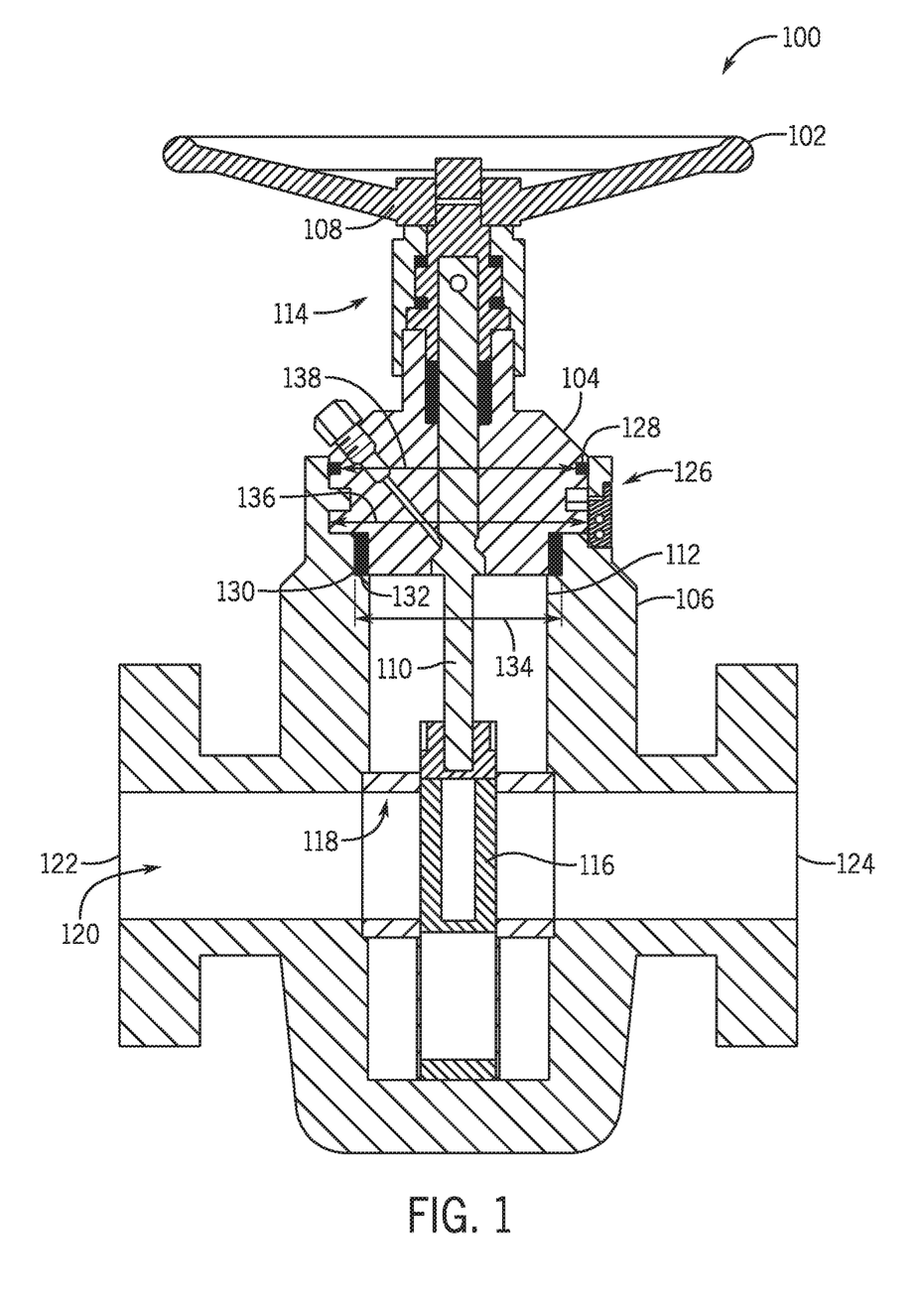
FIG. 1 is a cross-sectional side view of an embodiment of a valve assembly, in accordance with embodiments of the present disclosure.

FIG. 1 is a cross-sectional side view of an embodiment of a valve assembly 100 that includes an actuator 102, a bonnet 104, and a valve body 106. In various embodiments, the bonnet 104 may be integrally formed with the actuator 102. The illustrated actuator 102 is a manual actuator that includes a hand wheel 108. However, it should be appreciated that other types of actuators 102, such as hydraulic actuators, pneumatic actuators, electric actuators, and the like may also be utilized. Furthermore, it should be appreciated that the actuator 102 may be a linear valve actuator or a rotary valve actuator.

In the illustrated embodiment, the valve assembly 100 includes a valve stem 110 that extends through a valve chamber 112 formed within the valve body 106. The valve stem 110 is coupled to the actuator 102 at a first end 114 and to a valve member 116 at a second end 118. In operation, the valve member 116 is translated between an open position and a closed position. In the open position, a flow passage 120 is unobstructed (or at least partially unobstructed) and in a closed position the flow passage 120 is obstructed to block flow from an inlet 122 to an outlet 124.

Embodiments of the present disclosure include a quick connector 126 to couple the bonnet 104 directly to the valve body 106. It should be appreciated that while the illustrated embodiment includes a direct connection, in other embodiments, an intermediate component or piece may be arranged between the bonnet 104 and the valve body 106. Accordingly, embodiments should not be interpreted to require a direct connection between the bonnet 104 and the valve body 106. The illustrated quick connector 126 includes a lug system that enables a connection between the components without utilizing bolts or other threaded fasteners. In various embodiments, coupling between the bonnet 104 and the valve body 106 may be performed by rotating the bonnet 104 less than 360 degrees, less than 180 degrees, less than 90 degrees, less than 30 degrees, or the like. That is, minimal rotation may be utilized, based on, for example, a configuration of the lug system, which will be described below.

Further illustrated in FIG. 1 is an environmental seal 128 (e.g., first seal, seal, etc.) between the bonnet 104 and the valve body 106. The environmental seal 128 may block fluid positioned within the valve body 106 from flowing to an environment outside of the valve body 106. The seal may be formed, at least in part, by a compressible member that seals between the valve body 106 and the bonnet 104 when the bonnet 104 is coupled to the valve body 106. However, it should be appreciated that other seals may form metal-to-metal contact between the bonnet 104 and the valve body 106. Furthermore, seals may include combinations of materials, such as both elastomers and metals. Additionally, an internal seal 130 (e.g., second seal, seal, etc.) may be arranged proximate the valve chamber 112. The illustrated internal seal 130 is arranged on a shoulder 132 and has an outer diameter 134 less than a lug diameter 136, as will be described below. Accordingly, the internal seal 130 may be positioned and engaged upon installation of the bonnet 104.

In various embodiments, a diameter 138 of the environmental seal 128 may be substantially equal to the lug diameter 136. However, it should be appreciated that the diameter 138 may also be greater than or less than the lug diameter 136. In embodiments where the diameter is substantially equal, the environmental seal 128 may be compressed during installation of the bonnet 104. In various embodiments, however, the environmental seal 128 may be described as within a lug profile of the bonnet 104, and as a result, twisting or turning of the bonnet 104 may not be translated to the environmental seal 128.

Figure 2:
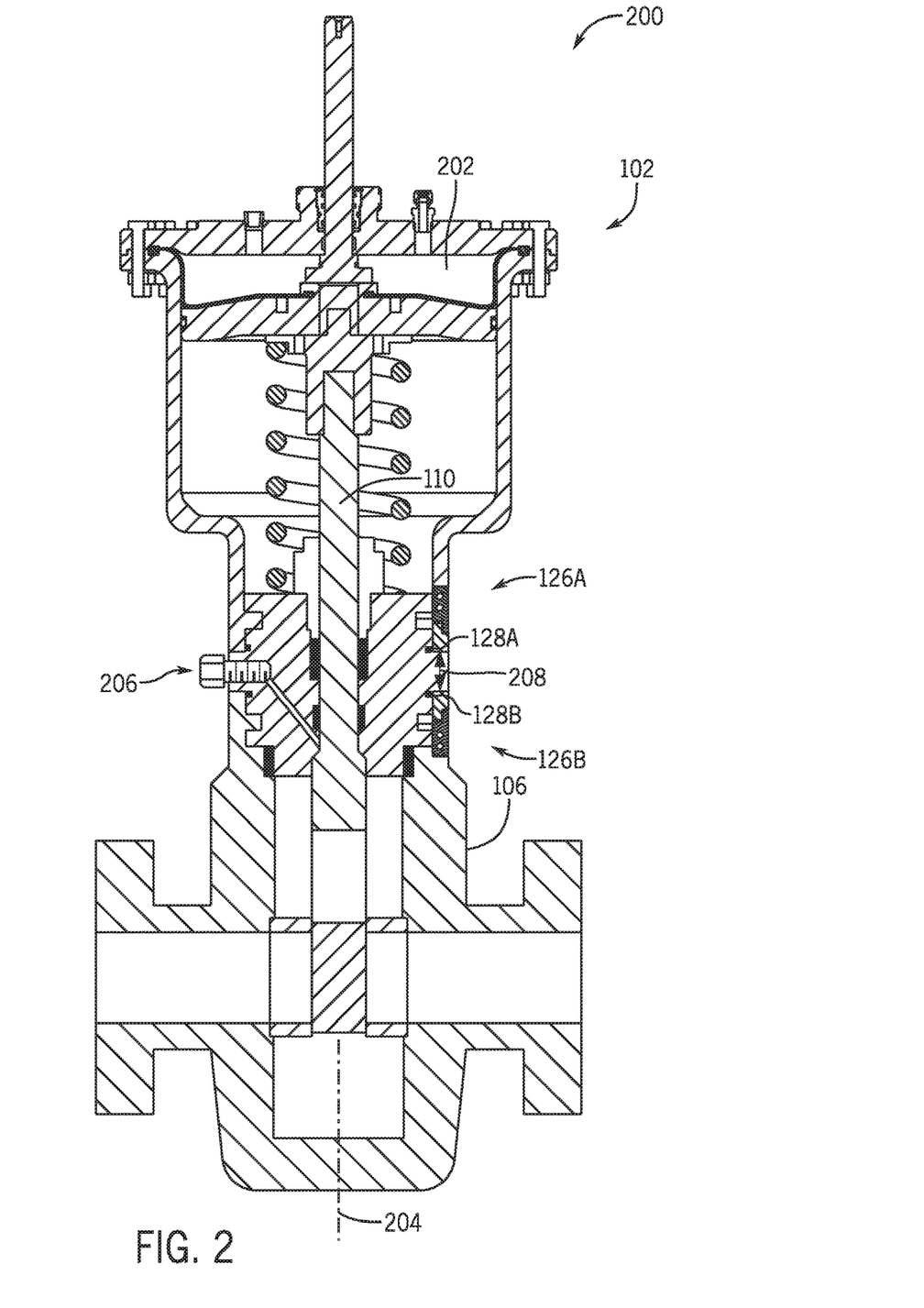
FIG. 2 is a cross-sectional side view of an embodiment of a valve assembly, in accordance with embodiments of the present disclosure.

FIG. 2 is a cross-sectional side view of an embodiment of the valve assembly 200 including the actuator 102 in the form of a diaphragm actuator. The diaphragm actuator may be driven by a working fluid, such as a gas or liquid, which is introduced within an actuator chamber 202 that drives the valve stem 110 in an axial direction along an axis 204. The illustrated bonnet 206 of the valve assembly 200 shares features with the bonnet 104 of FIG. 1, but includes two different quick connectors 126A, 126B that are arranged with a spaced apart relationship from one another. That is, a distance 208 separates the quick connector 126A from the quick connector 126B to enable room for operators to install the components. In the illustrated embodiment, the actuator 102 couples to the quick connector 126A and the valve body 106 couples to the quick connector 126B. Furthermore, each quick connector 126A, 126B includes an environmental seal 128A, 128B to maintain a sealing relationship between the bonnet 206 and the associated components. It should be appreciated that while the illustrated embodiment includes the pair of quick connectors and the pair of environmental seals, in other embodiments, various other configurations may be included that include more of fewer quick connectors, additional seal assemblies, and the like.

In various embodiments, assembly of the valve assembly 200 may be performed in a variety of ways. For example, the bonnet 206 may be installed to the valve body 106 first, followed by the actuator 102. In other embodiments, the bonnet 206 and the actuator 102 may be coupled together before coupling the bonnet 206 to the valve body 106. In certain embodiments, installation of the valve stem 110 may be performed in a certain order, which may impact the order in which the bonnet 206 is coupled to the valve body.

Figure 3:
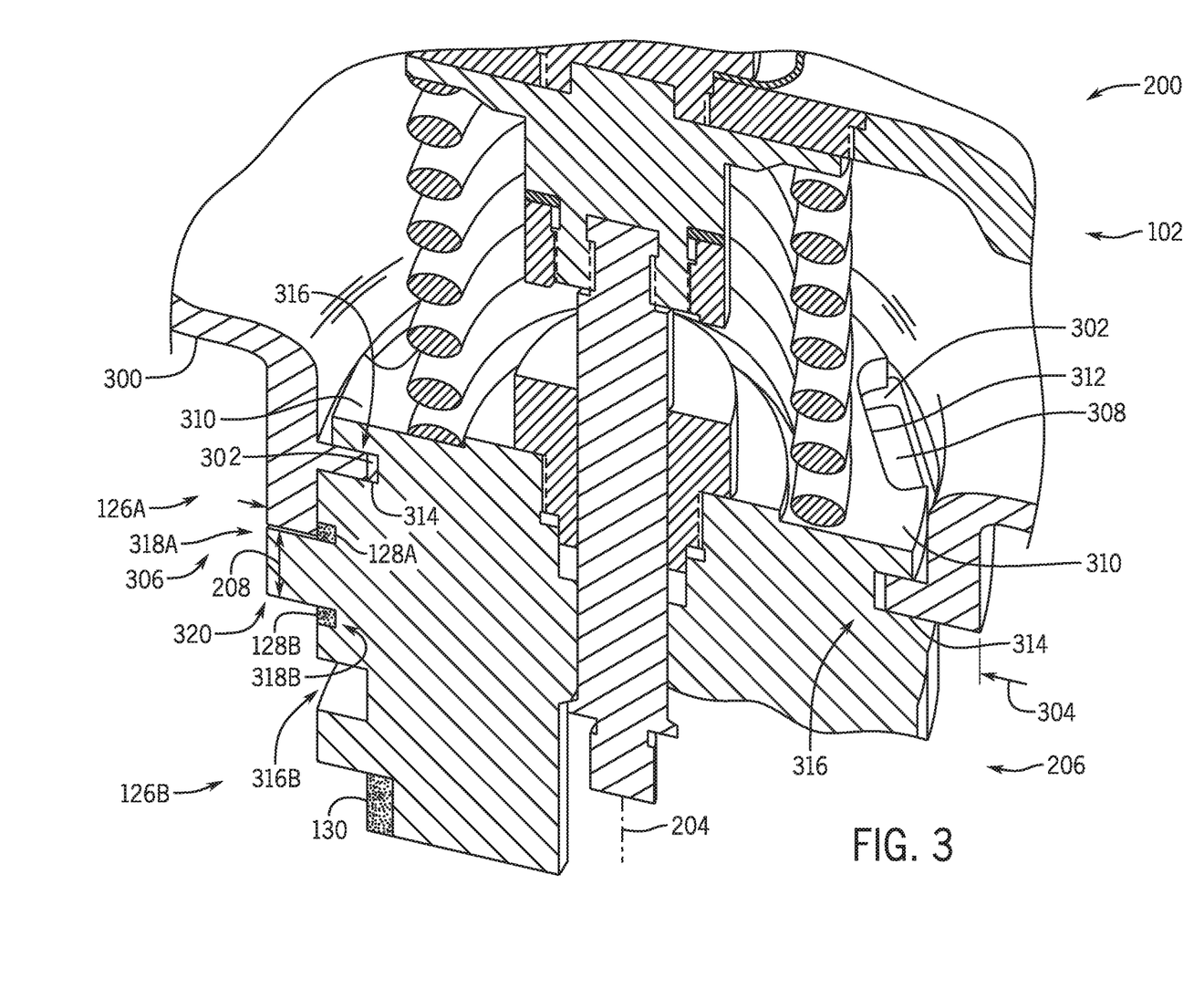
FIG. 3 is an isometric cross-sectional side view of an embodiment of a housing and bonnet coupled together via a quick connect, in accordance with embodiments of the present disclosure.

FIG. 3 is a cross-sectional isometric view of an embodiment of a portion of the valve assembly 200 including the actuator 102 and bonnet 206. It should be appreciated that various components and segments have been removed for clarity with the following discussion. The illustrated embodiment further includes the quick connectors 126A, 126B, which utilize a series of lugs that interact with the actuator 102 and valve body 106, respectively, to establish a bolt-less coupling system between the actuator 102, bonnet 206, and valve body 106. By removing the bolts from the system, it may be faster and easier to form the connections between the valve components. Furthermore, forming and machining the valves may also be simplified, which may reduce costs. Moreover, removal of the bolts may eliminate various industry regulations and standards associated with bolting applications.

The illustrated embodiment includes the various lug systems that couple the actuator 102 to the bonnet 206 via the quick connector 126A. However, it should be appreciated that a similar system may be utilized for the connection between the bonnet 206 and the valve body 106 via the quick connector 126B. In the illustrated embodiment, the actuator 102 includes an actuator housing 300 having a plurality of lugs 302 (e.g., housing lugs) that extend radially inward from an outer diameter 304 of the actuator housing 300 at a coupling section 306. The illustrated lugs 302 may be arranged circumferentially about the outer diameter 304 such that the lugs 302 are spaced apart with a gap or space 308 (e.g., housing lug space, housing lug gap) between the lugs 302. In other words, the housing lugs 302 are not continuous, but rather extend a circumferential distance and are separated by the spaces 308. The spaces 308 enable installation and removal of the actuator housing 300 with respect to the bonnet 206. The illustrated housing lugs 302 interact with the plurality of bonnet lugs 310 (e.g., lugs) to block axial movement of the actuator 102, along the axis 204, with respect to the bonnet 206 when the actuator housing 300 is rotated to align respective housing lugs 302 with respective bonnet lugs 310.

In various embodiments, the bonnet lugs 310 extend a circumferential distance and separated by spaces 312 (e.g., bonnet spaces, bonnet gaps). Moreover, a lower flange 314 is arranged axially lower than the bonnet lugs 310, forming a groove 316 that receives the housing lugs 302. In various embodiments, the housing lugs 302 have a circumferential distance that is less than a circumferential distance of the spaces 312, thereby enabling axial movement of the housing lugs 302 through the spaces 312. Thereafter, the housing lugs 302 may contact the lower flange 314 to secure the housing lugs 302 within the groove 316. In operation, the housing 300 may be rotated to substantially align the housing lugs 302 with the bonnet lugs 310, thereby blocking axial movement of the housing 300 relative to the bonnet 206.

The embodiment of FIG. 3 further illustrates the environmental seal 128A and the environmental seal 128B. The environmental seals 128A, 128B are formed within grooves 318A, 318B formed in the bonnet 206, however, it should be appreciated that one or more of the environmental seals 128A, 128B may be formed in the actuator housing 300 and/or the valve body 106 in other embodiments. The illustrated environmental seals 128A, 128B are arranged proximate a spacer section 320 having the distance 208 that separates the quick connector 126A from the quick connector 126B. It should be appreciated that the location of the environmental seals 128A, 128B may be varied based on operating conditions, machining methods, or the like. Further illustrated is the internal seal 130 axially lower than the groove 316B associated with the quick connector 126B. As described above, the internal seal 130 may be arranged on the shoulder 132 (not pictured) formed in the valve body 106.

It should be appreciated that, in various embodiments, various dimensions of the components of the illustrated embodiment may be particularly selected based on operating conditions. For example, a thickness of the lugs 302, 310 (e.g., an axial length) may be particularly selected based on expected operating conditions. Similarly, a circumferential length of the lugs 302, 310 may be particularly selected based on expected operating conditions or a desired number of lugs 302, 310. Moreover, there may be more rows of the lugs 302, 310, which would lead to more grooves 316. Accordingly, different configurations may be used to accommodate a variety of operating pressures.

Figure 4:
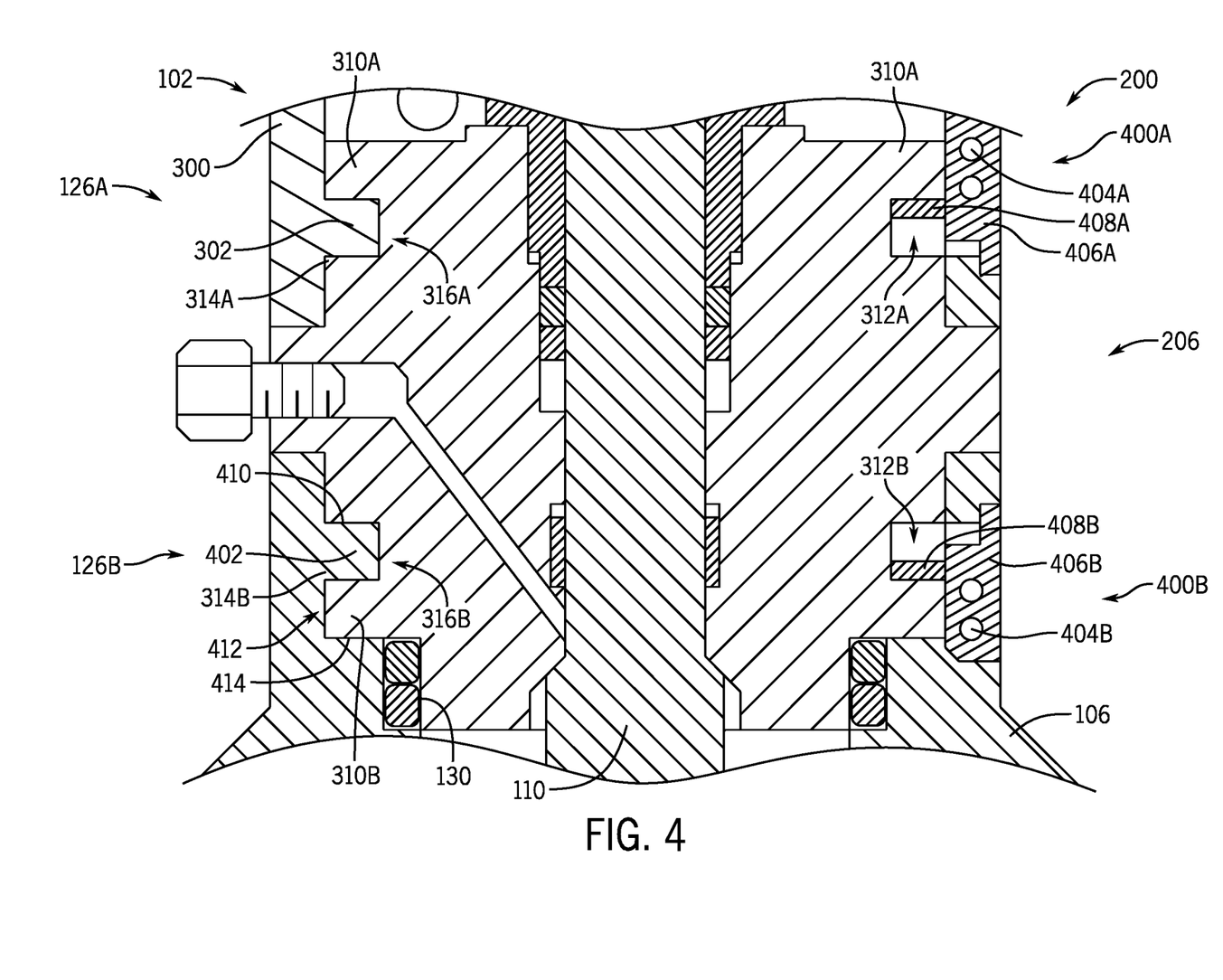
FIG. 4 is a cross-sectional side view of an embodiment of a bonnet coupled to an actuator housing and a valve body via respective quick connectors, in accordance with embodiments of the present disclosure.

FIG. 4 is a cross-sectional side view of an embodiment of the valve assembly 200 including the bonnet 206 where both the actuator 102 and the valve body 106 are coupled to the bonnet 206. In the illustrated embodiment, each of the quick connectors 126A, 126B includes a locking mechanism 400 that secures the respective actuator 102 and valve body 106 to the bonnet 206 to block rotational movement of the actuator 102 and/or the valve body 106. In various embodiments, the respective locking mechanisms 400A, 400B may receive at least a portion of a torqueing force that may be a result of the movement of the valve member 116 between the open position and the closed position.

The illustrated embodiment includes the housing lugs 302 and valve body lugs 402 arranged within respective grooves 316A, 318B. The housing lugs 302 and the valve body lugs 402 may be axially aligned with corresponding bonnet lugs 310A, 310B such that axial movement of the actuator housing 300 and the valve body 106 is blocked. The illustrated locking mechanisms 400A, 400B may include a pivot point 404A, 404B, which is normal relative to the plane of the page in the illustrated embodiment, to enable rotation of a body 406A, 406B of the locking mechanism 400A, 400B. The body 406A, 406B may include an extension 408A, 408B that extends into the respective spaces 312A, 312B between the bonnet lugs 310A, 310B to block rotation of the actuator 102 and/or the valve body 106. In other words, the extensions 408A, 408B may be arranged between the bonnet lugs 310A, 301B such that rotation of the actuator 102 and/or the valve body 106 is blocked. Moving the body 406A, 406B about the pivot point 404A, 404B may remove the extensions 408A, 408B from the spaces 312A, 312B to enable rotation of the actuator 102 and/or the valve body 106. In this manner, the actuator 102 and/or the valve body 106 may be locked in place to enable operations without using bolts or other fasteners. However, it should be appreciated that bolts or other threaded fittings may also be incorporated with the locking mechanism 400.

As described above, in various embodiments there may be a number of similarities between the quick connectors 126A, 126B. However, as illustrated in FIG. 4, there may be additional components associated with the quick connector 126B. The illustrated embodiment includes the valve body lugs 402 positioned within the groove 316B and seated on the lower flange 314B. However, further illustrated are the bonnet lugs 310B, which are arranged mirror from the bonnet lugs 310A such that the bonnet lugs 310B form the lower portion of the groove 316B while an upper flange 410 forms the upper portion of the groove 316B. The bonnet lugs 310B are arranged within a valve body groove 412 formed between the valve body lugs 402 and a valve body flange 414. Accordingly, in various embodiments, the bonnet lugs 310B may pass through valve body spaces 416 (FIG. 5) positioned between the valve body lugs 402, such as the housing lug spaces 308 described above. Accordingly, in various embodiments, both the bonnet lugs 310B and the valve body lugs 402 may be arranged within respective grooves 316B, 412. Further illustrated is the inner seal 130 arranged proximate the valve body groove 412, which may be at least partially loaded via installation of the bonnet 206.

Figure 5A:
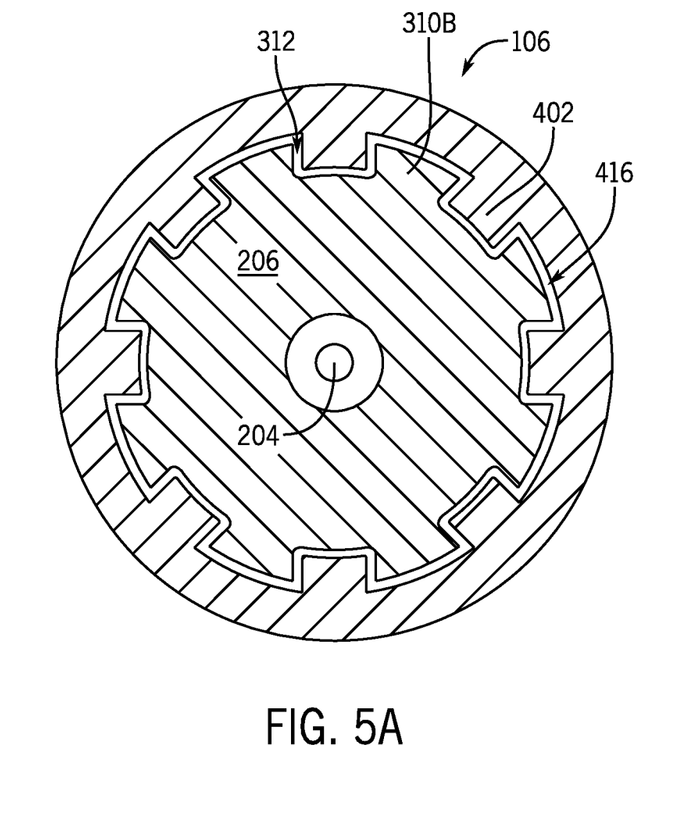
FIGS. 5A and 5B are top plan views of embodiments of a bonnet interfacing with a valve body, in accordance with embodiments of the present disclosure.
Figure 5B:
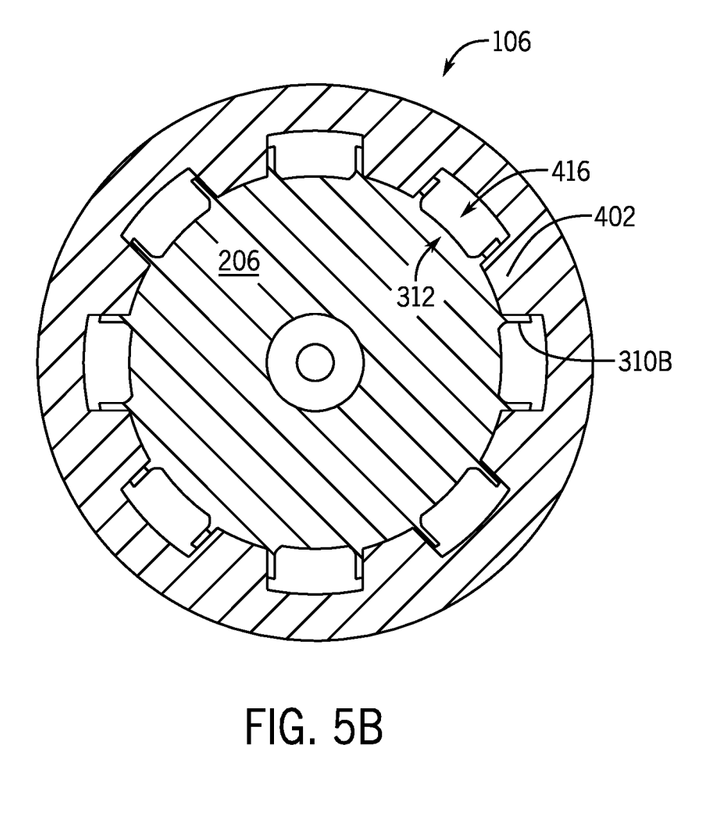

FIGS. 5A and 5B are top plan cross-sectional views of an embodiment of the valve body 106 interfacing with the bonnet 206 via valve body lugs 402 and bonnet lugs 310B. It should be appreciated that a similar configuration may also be utilized with the housing lugs 302. In the illustrated embodiment, the bonnet 206 is arranged circumferentially within at least a portion of the valve body 106. However, other portions of the bonnet 206 may be outside of the valve body 106 or substantially aligned with the valve body 106. It should also be appreciated that various components have been removed for clarity with the following discussion.

In the illustrated embodiment, the valve body lugs 402 extend radially inward toward the axis 204. The illustrated valve body lugs 402 are arranged within the spaces 312 positioned between adjacent bonnet lugs 310B. The bonnet lugs 410 extend radially outward from the axis 204 and are positioned within spaces 416 between the valve body lugs 402. As described above, the spaces 416 may be similar to the spaces 308 associated with the actuator housing 300. The arrangement illustrated in FIG. 5A enables the axial movement of the bonnet 206 and/or the valve body 106 along the axis 204. For example, the bonnet 206 may be lowered through the spaces 416 such that the bonnet lugs 310B are arranged within the valve body groove 412.

In operation, at least one of the valve body 106 and the bonnet 206 may be rotated to align, at least partially, the bonnet lugs 310B with the valve body lugs 402, as illustrated in FIG. 5B. As a result, axial movement between the valve body 106 and the bonnet 206 is blocked due to the interference between the bonnet lugs 310B and the valve body lugs 402. In various embodiments, the rotation is less than one full rotation of the valve body 106 and/or the bonnet 206. For example, the rotation can be approximately 10 degrees, approximately 20 degrees, approximately 30 degrees, approximately 40 degrees, approximately 50 degrees, approximately 60 degrees, approximately 70 degrees, approximately 80 degrees, approximately 90 degrees, approximately 100 degrees, approximately 110 degrees, approximately 120 degrees, approximately 130 degrees, approximately 140 degrees, approximately 150 degrees, approximately 160 degrees, approximately 170 degrees, approximately 180 degrees, approximately 190 degrees, approximately 200 degrees, approximately 210 degrees, approximately 220 degrees, approximately 230 degrees, approximately 240 degrees, approximately 250 degrees, approximately 260 degrees, approximately 270 degrees, approximately 280 degrees, approximately 290 degrees, approximately 300 degrees, approximately 310 degrees, approximately 320 degrees, approximately 330 degrees, approximately 340 degrees, approximately 350 degrees, or any other reasonable rotational amount. Moreover, the valve body spaces 416 and the bonnet spaces 312 are substantially aligned.

It should be appreciated that while the embodiments illustrated in FIGS. 5A and 5B include an equal number of bonnet lugs 310B and valve body lugs 402, that in other embodiments that may not be an equal number. For example, there may be more bonnet lugs 310B than valve body lugs 402. Furthermore, while the illustrated embodiment includes eight bonnet lugs 310B and eight valve body lugs 402, any other reasonable number of lugs 310B, 402 may be included.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A valve assembly, comprising:
an actuator adapted to drive movement of a valve member between an open position and a closed position;
a bonnet coupled to the actuator;
a valve body coupled to the bonnet, the bonnet arranged between at least a portion of the actuator and the valve body;
a quick connector adapted to couple the bonnet to the valve body, the quick connector comprising:
a plurality of bonnet lugs separated by a plurality of spaces, the plurality of bonnet lugs extending radially outward from an axis; and
a plurality of valve body lugs configured to interact with the plurality of bonnet lugs, the plurality of bonnet lugs being arranged to axially align with the plurality of valve body lugs to block axial movement of the bonnet with respect to the valve body;
a first seal positioned between the bonnet and the actuator, the first seal positioned axially above at least one valve body lug of the plurality of valve body lugs and at least one bonnet lug of the plurality of bonnet lugs;
a second seal positioned between the bonnet and the valve body, the second seal arranged on a shoulder formed along an opening in the valve body, the shoulder having a shoulder outer diameter that is greater than an opening outer diameter that receives the bonnet; and
a bonnet groove formed, at least in part, by a bonnet lug of the plurality of bonnet lugs and a lower flange, the lower flange arranged axially lower than the bonnet lug of the plurality of bonnet lugs, the bonnet groove receiving a valve body lug of the plurality of valve body lugs.

2. The valve assembly of claim 1, further comprising:
a plurality of valve body spaces arranged between the valve body lugs.

3. The valve assembly of claim 1, wherein a circumferential length of each valve body lug of the plurality of valve body lugs is less than a circumferential length of each space of the plurality of spaces.

4. The valve assembly of claim 1, further comprising:
a locking mechanism formed in at least one of the bonnet or the valve body, the locking mechanism moving between an engaged position that blocks rotational movement of the bonnet and a disengaged position that enables rotational movement of the bonnet.

5. The valve assembly of claim 1, wherein the second seal is arranged axially lower than the bonnet lugs.

6. The valve assembly of claim 1, wherein a groove receiving the first seal is formed within the bonnet and a diameter of the first seal is approximately equal to a bonnet lug diameter.

7. A valve assembly, comprising:
an actuator configured to drive movement of a valve stem between a first position and a second position;
a valve body;
a valve member coupled to the valve stem, wherein movement of the valve stem drives movement of the valve member between the first position and the second position;
a bonnet adapted to couple the actuator to the valve body, the bonnet being arranged between the actuator and the valve body, comprising:
a first connector adapted to couple to the actuator, the first connector comprising a plurality of first bonnet lugs having a plurality of first spaces between adjacent first bonnet lugs of the plurality of first bonnet lugs, the first spaces arranged to permit movement of corresponding actuator lugs to move axially with respect to the bonnet through the first spaces and to block axial movement of the actuator relative to the bonnet when the plurality of first bonnet lugs are axially aligned with the actuator lugs; and
a second connector adapted to couple to the valve body, the second connector comprising a plurality of second bonnet lugs having a plurality of second spaces between adjacent second bonnet lugs of the plurality of second bonnet lugs, the second spaces arranged to permit movement of corresponding valve body lugs to move axially with respect to the bonnet through the second spaces and to block axial movement of the valve body relative to the bonnet when the plurality of second bonnet lugs are axially aligned with the valve body lugs;
a first seal positioned between the bonnet and the actuator, the first seal arranged axially lower than the plurality of first bonnet lugs;
a second seal positioned between the bonnet and the valve body, the second seal arranged axially higher than the plurality of second bonnet lugs and axially lower than the first seal; and
a third seal positioned between the bonnet and the valve body, the third seal arranged axially lower than the second seal, the third seal arranged along an opening formed in the valve body and positioned to at least partially overlap a lower portion of the bonnet, the third seal isolating the plurality of first bonnet lugs and the plurality of second bonnet lugs from working fluid within the valve body.

8. The valve assembly of claim 7, further comprising:
a spacer section of the bonnet arranged between the first connector and the second connector.

9. The valve assembly of claim 7, further comprising:
a first bonnet groove formed, at least in part, by the plurality of first bonnet lugs and a lower flange arranged axially lower than the plurality of first bonnet lugs, the first bonnet groove receiving the plurality of actuator lugs; and
a second bonnet groove formed, at least in part, by the plurality of second bonnet lugs and an upper flange arranged axially higher than the plurality of second bonnet lugs, the second bonnet groove receiving the plurality of valve body lugs.

10. The valve assembly of claim 7, further comprising:
a valve body groove formed, at least in part, by the plurality of valve body lugs and a valve body lower flange arranged axially lower than the plurality of valve body lugs, the valve body groove receiving the plurality of second bonnet lugs.

11. The valve assembly of claim 7, further comprising:
a first locking mechanism, formed in the actuator, the first locking mechanism moving between an engaged position to block rotational movement of the actuator relative to the bonnet and a disengaged position to permit rotation movement of the actuator relative to the bonnet; and
a second locking mechanism, formed in the valve body, the second locking mechanism moving between an engaged position to block rotational movement of the valve body relative to the bonnet and a disengaged position to permit rotation movement of the valve body relative to the bonnet.

12. The valve assembly of claim 11, further comprising:
a first locking extension, coupled to a first body of the first locking mechanism, the first locking extension extending radially inward toward a first space of the plurality of first spaces, the first locking extension contacting a first bonnet lug of the plurality of first bonnet lugs in response to a rotational force applied to one of the bonnet or the actuator; and
a second locking extension, coupled to a second body of the second locking mechanism, the second locking extension extending radially inward toward a second space of the plurality of second spaces, the second locking extension contacting a second bonnet lug of the plurality of second bonnet lugs in response to a rotational force applied to one of the bonnet or the valve body.

13. The valve assembly of claim 7, wherein a first seal diameter is substantially equal to a second seal diameter, and a third seal outer diameter is less than a first seal outer diameter.

14. The valve assembly of claim 7, wherein a first seal diameter is substantially equal to a first plurality of lugs diameter and a second seal diameter is substantially equal to a second plurality of lugs diameter.

15. The valve assembly of claim 7, wherein the third seal is seated on a shoulder formed in the valve body, the third seal arranged radially inward of the valve body lugs.

* * * * *